(12) United States Patent
Murayama et al.

(10) Patent No.: US 9,522,662 B2
(45) Date of Patent: Dec. 20, 2016

(54) CYLINDER DEVICE

(71) Applicants: HONDA MOTOR CO., LTD., Minato-Ku, Tokyo (JP); NISSIN KOGYO CO., LTD., Ueda-Shi, Nagano (JP)

(72) Inventors: Kazuaki Murayama, Wako (JP); Takaaki Ohnishi, Wako (JP); Nobuyuki Kobayashi, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 320 days.

(21) Appl. No.: 14/388,832

(22) PCT Filed: Mar. 29, 2013

(86) PCT No.: PCT/JP2013/059474
§ 371 (c)(1),
(2) Date: Sep. 29, 2014

(87) PCT Pub. No.: WO2013/147127
PCT Pub. Date: Oct. 3, 2013

(65) Prior Publication Data
US 2015/0082786 A1    Mar. 26, 2015

(30) Foreign Application Priority Data

Mar. 30, 2012 (JP) .................................. 2012-083068

(51) Int. Cl.
*B60T 11/26*    (2006.01)
*B60T 13/74*    (2006.01)
(Continued)

(52) U.S. Cl.
CPC ................ *B60T 11/26* (2013.01); *B60T 7/042* (2013.01); *B60T 8/368* (2013.01); *B60T 8/4081* (2013.01);
(Continued)

(58) Field of Classification Search
CPC ...................................................... B60T 11/26
(Continued)

(56) References Cited

U.S. PATENT DOCUMENTS 4,760,700 A * 8/1988 Pickering ................ B60T 11/22
403/274
4,773,224 A * 9/1988 Sakamoto ............... B60T 11/16
60/585
(Continued)

FOREIGN PATENT DOCUMENTS

| CN | 101676585 A | 3/2010 |
| DE | 9415262 U1 | 1/1996 |
(Continued)

OTHER PUBLICATIONS

Extended European Search Report issued on Mar. 11, 2016 for corresponding European Patent Application No. 13769178.8.
(Continued)

*Primary Examiner* — Thomas E Lazo
*Assistant Examiner* — Daniel Collins
(74) *Attorney, Agent, or Firm* — Carrier Blackman & Associates, P.C.; Joseph P. Carrier; William D. Blackman

(57) ABSTRACT

A cylinder device, which is provided with: a substrate having a cylinder hole and a reservoir union port; a piston which is inserted into the cylinder hole; a regulation member which regulates the rearward limit of the piston; a reservoir having a liquid supply part; and a seal member which is for the reservoir and which is externally fitted to the liquid supply part. Therein: the substrate comprises a mounting
(Continued)

hole and a first communication hole which open to the reservoir union port and the cylinder hole; the regulation member is inserted into the mounting hole (11$h$); and the liquid supply part has a cut-out section and a tip section arranged so as to face the regulation member. This structure enables the number of components to be reduced, reduces the size of the substrate, and also prevents air from collecting inside the reservoir union port.

5 Claims, 5 Drawing Sheets

(51) Int. Cl.
*B60T 8/36* (2006.01)
*B60T 8/40* (2006.01)
*B60T 7/04* (2006.01)
*B60T 13/14* (2006.01)
*B60T 13/66* (2006.01)
*B60T 13/68* (2006.01)

(52) U.S. Cl.
CPC ............ *B60T 13/146* (2013.01); *B60T 13/662* (2013.01); *B60T 13/686* (2013.01); *B60T 13/745* (2013.01)

(58) Field of Classification Search
USPC .......................................................... 60/585
See application file for complete search history.

(56) References Cited

U.S. PATENT DOCUMENTS

| 5,636,517 A | 6/1997 | Mallmann |
| 2009/0195059 A1 | 8/2009 | Taira |

FOREIGN PATENT DOCUMENTS

| EP | 2165898 A1 | 3/2010 |
| FR | 2134082 A1 | 12/1972 |
| JP | 08-337164 A | 12/1996 |
| JP | 11-91543 A | 4/1999 |
| JP | 2007-308053 A | 11/2007 |
| JP | 2008-238887 A | 10/2008 |
| JP | 2009-279966 A | 12/2009 |

OTHER PUBLICATIONS

Office Action issued Dec. 24, 2015 for corresponding Chinese Patent Application No. 201380016506.5.

\* cited by examiner

CYLINDER DEVICE

TECHNICAL FIELD

The present invention relates to a cylinder device which is used in a vehicle brake system.

BACKGROUND ART

Some type of cylinder device which generates a brake pressure according to the amount of manipulation of a brake manipulator includes a base body, a piston, an elastic member, and a reservoir. A cylinder bore and a reservoir union port are formed in the base body, the piston is inserted in the cylinder bore, the elastic member is arranged between the bottom surface of the cylinder bore and the piston, and the reservoir has a fluid feeding portion inserted into the reservoir union port. In such a cylinder device, a rod-like limiting member is arranged to project into the cylinder bore such that the backward motion of the piston is limited by abutting of the piston on the limiting member. (See, for example, Patent Literature 1.)

CITATION LIST PATENT LITERATURE

Patent Literature 1: Japanese Patent Laid-Open No. 2009-279966

SUMMARY OF INVENTION

Technical Problem

In the aforementioned conventional cylinder device, a limiting member is inserted in an installation bore penetrating through a circumferential wall of the base body in such a manner that the limiting member projects into the cylinder bore. In this arrangement, it is necessary to arrange on the outer circumferential surface of the base body a means for preventing a fall of the limiting member, and seal the installation bore from the external space. Therefore, it is necessary to secure space for arranging parts for the fall prevention and the sealing, as the number of parts increases.

The object of the present invention is to solve the above problems, and provide a cylinder device which can reduce the number of parts and the size of the base body by effectively using a space in the base body for arranging a limiting member for limiting the backward motion of the piston, and can further prevent accumulation of air in a reservoir union port.

Solution to Problem

In order to accomplish the above object, according to the present invention, a cylinder device for generating a brake pressure according to an amount of manipulation of a brake manipulator is provided. The cylinder device includes: a base body in which a cylinder bore and a reservoir union port are formed, and the cylinder bore has a bottom, and the reservoir union port communicates with the cylinder bore, and a reservoir reserving brake fluid is connected to the reservoir union port; a piston inserted in the cylinder bore; an elastic member arranged between a bottom surface of the cylinder bore and the piston; a limiting member which projects into the cylinder bore and limits backward motion of the piston; the reservoir which has a fluid feeding portion having a tubular shape and being inserted in the reservoir union port; and a reservoir sealing member which has an annular shape and is externally fitted on the fluid feeding portion. In the cylinder device, a communication bore and an installation bore each of which has an end opened in the bottom surface of the reservoir union port and another end opened in an inner circumferential surface of the cylinder bore are formed in the base body, and the limiting member is inserted in the installation bore; and the fluid feeding portion includes a tip portion arranged opposed to the limiting member, and a cutout portion extended in an axial direction to the tip side of the fluid feeding portion.

In the above structure, a means for preventing a fall of the limiting member is realized by the fluid feeding portion of the reservoir, and the installation bore is sealed from the external space by the reservoir sealing member which is externally fitted on the fluid feeding portion. That is, according to the present invention, the limiting member is arranged by effectively using the space in the base body. Therefore, it is possible to reduce the number of parts and the size of the base body.

In addition, even when air intrudes into the gap between the inner circumferential surface of the reservoir union port and the outer circumferential surface of the fluid feeding portion, the air is exhausted into the reservoir through the cutout portion of the fluid feeding portion, so that accumulation of air in the reservoir union port can be prevented. Further, in the case where the cutout portion is formed to extend to the vicinity of the reservoir sealing member, air can be exhausted from the gap between the inner circumferential surface of the reservoir union port and the outer circumferential surface of the fluid feeding portion with high reliability.

In the case where the communication bore is formed in a position opposed to the cutout portion, it is possible to cause the brake fluid to smoothly flow from the fluid feeding portion into the communication bore. In addition, since the cutout portion is formed in the fluid feeding portion, the communication bore can be formed close to the outer peripheral portion of the bottom surface of the reservoir union port, so that the degree of freedom in designing the cylinder device can be increased.

In the case where the piston includes a shaft member and a flange portion formed on an outer circumferential surface of the shaft member, and a pressure chamber is formed between the bottom surface of the cylinder bore and the shaft member, it is possible to cause the brake fluid to smoothly flow into the communication bore through a feeding path by arranging, on the pressure chamber side of the flange portion, a piston sealing member externally fitted on the shaft member, and arranging the communication bore to be opened in the inner circumferential surface of the cylinder bore on the side, opposite to the pressure chamber, of the piston sealing member, and forming in the flange portion the feeding path which is open on the pressure chamber side and on the side opposite to the pressure chamber. This arrangement is particularly effective in the case where the amount of the brake fluid absorbed to the pressure chamber side is great.

In the case where the piston sealing member is a cup seal, and an outer peripheral portion of the piston sealing member allows only the flow of the brake fluid from the side opposite to the pressure chamber to the pressure chamber side, it is possible to prevent flow of the brake fluid from the pressure chamber to the side, opposite to the pressure chamber, of the piston sealing member, and feed the brake fluid to the pressure chamber over the outer peripheral portion of the piston sealing member.

Effect of Invention

In the cylinder device according to the present invention, a means for prevention of a fall of the limiting member is realized by the fluid feeding portion of the reservoir, and the installation bore is sealed from the external space by the reservoir sealing member. Therefore, it is possible to reduce the number of parts and the size of the base body. In addition, since the air which intrudes into the gap between the inner circumferential surface of the reservoir union port and the outer circumferential surface of the fluid feeding portion is exhausted through the cutout portion in the fluid feeding portion, it is possible to prevent accumulation of the air in the reservoir union port.

BRIEF DESCRIPTION OF DRAWINGS

FIG. 5A is a cross-sectional view at the A-A cross section in FIG. 3, and FIG. 5B is a cross-sectional view at the B-B cross section in FIG. 5A.

DESCRIPTION OF EMBODIMENTS

An embodiment of the present invention is explained below with reference to the accompanying drawings. The present embodiment is an embodiment of the cylinder device according to the present invention, which is used in the vehicle brake system A illustrated in FIG. 1.

Figure 1:
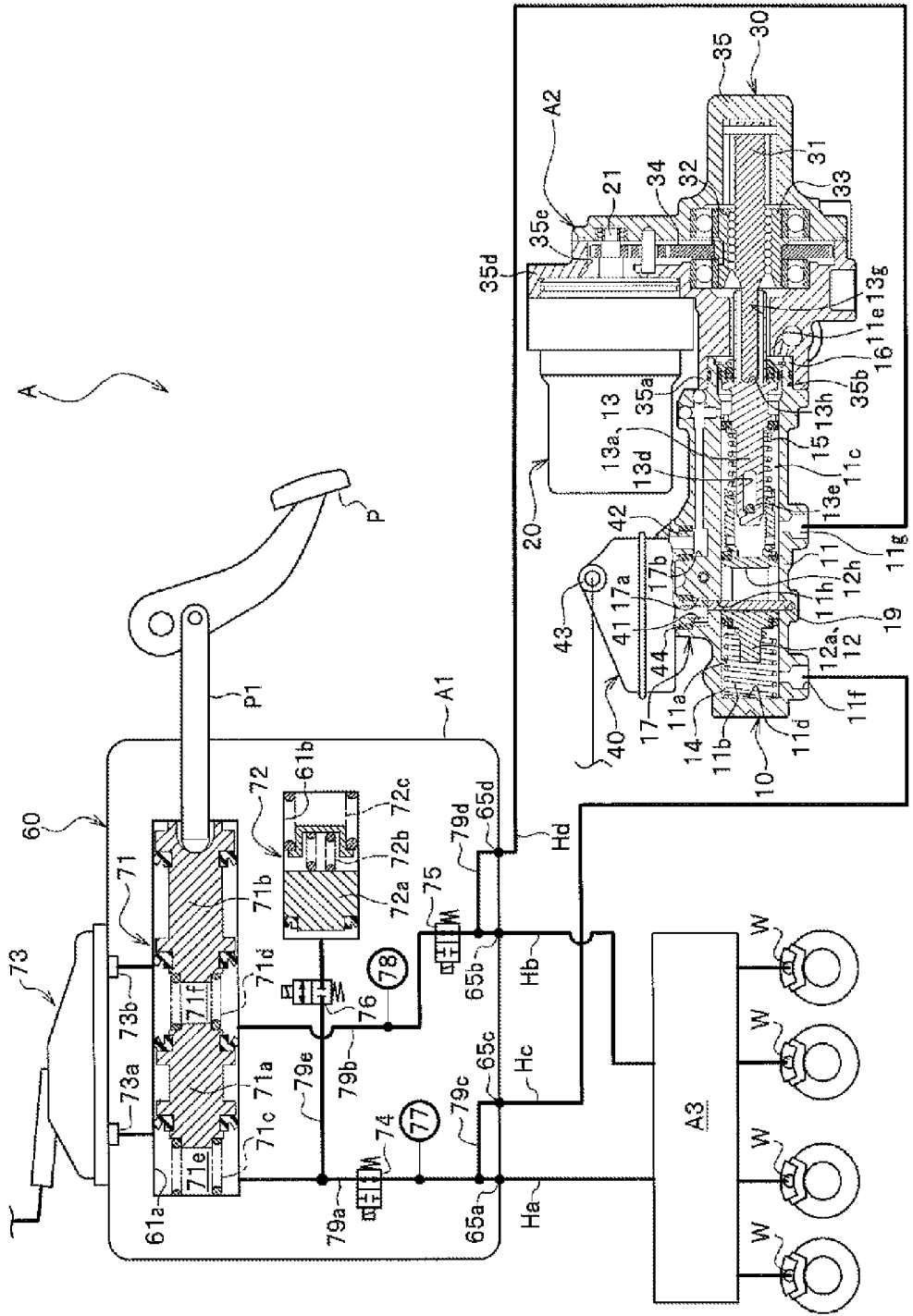
FIG. 1 is a construction diagram illustrating the entire construction of a vehicle brake system using a motor cylinder device according to an embodiment.

The vehicle brake system A illustrated in FIG. 1 includes both of a by-wire brake system which operates when a prime mover (an engine, an electric motor, or the like) is started, and a hydraulic brake system which operates at times of emergency or stop of the prime mover. The vehicle brake system A includes a master cylinder device A1, a motor cylinder device A2, and a hydraulic control device A3. The master cylinder device A1 generates a hydraulic brake pressure according to the tread force with which the brake pedal P (as a brake manipulator) is depressed, the motor cylinder device A2 generates a hydraulic brake pressure by use of the electric motor 20, and the hydraulic control device A3 assists in stabilization of the vehicle behavior. The master cylinder device A1, the motor cylinder device A2, and the hydraulic control device A3 are respectively configured in the forms of separate units, and are connected through external piping.

The vehicle brake system A can be mounted on vehicles including the automobiles driven by only an engine (internal-combustion-engine), hybrid electric vehicles using electric motors as well as an engine, and electric vehicles, fuel-cell vehicles, and the like which use only electric motors as power sources.

The master cylinder device A1 includes a tandem-type master cylinder 71, a stroke simulator 72, a reservoir 73, normally-open shutoff valves 74 and 75, a normally-close shutoff valve 76, pressure sensors 77 and 78, main hydraulic paths 79a and 79b, hydraulic communication paths 79c and 79d, and a hydraulic branch path 79e. The above components are installed in a base body 60, and the respective hydraulic paths are formed inside the base body 60.

The master cylinder 71 converts the tread force on the brake pedal P into the hydraulic brake pressure. The master cylinder 71 includes a first piston 71a, a second piston 71b, a first elastic member 71c, and a second elastic member 71d. The first piston 71a is arranged on the bottom surface side of a first cylinder bore 61a, the second piston 71b is connected to a push rod P1, the first elastic member 71c is contained in a first pressure chamber 71e formed between the bottom surface of the first cylinder bore 61a and the first piston 71a, and the second elastic member 71d is contained in a second pressure chamber 71f formed between the pistons 71a and 71b.

The second piston 71b is connected to the brake pedal P through the push rod P1. The pistons 71a and 71b receive the tread force from the brake pedal P, slide in the first cylinder bore 61a, and pressurize the brake fluid in the pressure chambers 71e and 71f. The main hydraulic paths 79a and 79b respectively communicate with the pressure chambers 71e and 71f.

The stroke simulator 72 generates a simulated reaction force in response to a manipulation of the brake pedal P, and includes a piston 72a and two elastic members 72b and 72c. The piston 72a slides in a second cylinder bore 61b, and the elastic members 72b and 72c bias the piston 72a toward the bottom surface side. The stroke simulator 72 communicates with the first pressure chamber 71e in the master cylinder 71 through the hydraulic branch path 79e and the main hydraulic path 79a, so that the hydraulic brake pressure generated in the first pressure chamber 71e actuates the piston 72a.

The reservoir 73 is a container reserving the brake fluid, and includes the fluid feeding bores 73a and 73b connected to the master cylinder 71. A hose extended from a main reservoir (not shown) is connected to the reservoir 73.

The main hydraulic paths 79a and 79b are hydraulic paths originated from the master cylinder 71. Tubes Ha and Hb extending to the hydraulic control device A3 are connected to the output ports 65a and 65b, at which the main hydraulic paths 79a and 79b terminate.

The hydraulic communication paths 79c and 79d are hydraulic paths extending from the input ports 65c and 65d to the main hydraulic paths 79a and 79b. Tubes Hc and Hd extending to the motor cylinder device A2 are connected to the input ports 65c and 65d.

The hydraulic branch path 79e is a hydraulic path which branches off from the main hydraulic path 79a extending to the first pressure chamber 71e, and extends to the stroke simulator 72.

The normally-open shutoff valves 74 and 75 open and close the main hydraulic paths 79a and 79b, and are realized by normally-open solenoid valves.

The normally-open shutoff valve 74 opens and closes the main hydraulic path 79a in the section from the intersection point of the main hydraulic path 79a and the hydraulic branch path 79e to the intersection point of the main hydraulic path 79a and the hydraulic communication path 79c. The normally-open shutoff valve 75 opens and closes the main hydraulic path 79b on the upstream side of the intersection point of the main hydraulic path 79b and the hydraulic communication path 79d.

The normally-close shutoff valve 76 opens and closes the hydraulic branch path 79e, and is realized by a normally-closed solenoid valve.

The pressure sensors 77 and 78 detect the magnitude of the hydraulic brake pressure, and are fitted to sensor installation bores (not shown) which communicate with the main hydraulic paths 79a and 79b. The pressure sensor 77 is arranged on the downstream side of the normally-open shutoff valve 74, and detects the hydraulic brake pressure generated in the motor cylinder device A2 when the normally-open shutoff valve 74 is in a closed state (in the state in which the main hydraulic path 79a is shut off). The pressure sensor 78 is arranged on the upstream side of the normally-open shutoff valve 75, and detects the hydraulic brake pressure generated in the master cylinder 71 when the normally-open shutoff valve 75 is in a closed state (in the state in which the main hydraulic path 79b is shut off). The information acquired by the pressure sensors 77 and 78 is outputted to an electronic control unit (not shown).

The master cylinder device A1 communicates with the hydraulic control device A3 through the tubes Ha and Hb. The hydraulic brake pressure generated in the master cylinder 71 when the normally-open shutoff valves 74 and 75 are in an open state is inputted to the hydraulic control device A3 through the main hydraulic paths 79a and 79b and the tubes Ha and Hb.

The motor cylinder device A2 includes a tandem-type slave cylinder 10, an electric motor 20, a drive transmission portion 30, and a reservoir 40. (See FIG. 2.)

The slave cylinder 10 generates a hydraulic brake pressure corresponding to the hydraulic brake pressure generated in the master cylinder 71. The slave cylinder 10 includes the base body 11, a first slave piston 12, a second slave piston 13, a first elastic member 14, and a second elastic member 15. The first slave piston 12 is arranged on the bottom surface 11d side of a slave cylinder bore 11a formed in the base body 11. The second slave piston 13 is arranged on the opening 11e side of the slave cylinder bore 11a formed in the base body 11. The first elastic member 14 is contained in a first pressure chamber 11b formed between the bottom surface 11d of the slave cylinder bore 11a and the first slave piston 12. The second elastic member 15 is contained in a second pressure chamber 11c formed between the slave pistons 12 and 13.

A rod 31 in the drive transmission portion 30 is in contact with the rear portion of the second slave piston 13. In addition, the first slave piston 12 and the second slave piston 13 receive an input from the rod 31, slide in the slave cylinder bore 11a, and pressurize the brake fluid in the pressure chambers 11b and 11c. Further, the pressure chambers 11b and 11c respectively communicate with the tubes Hc and Hd.

The electric motor 20 is a servo motor which is under drive control based on a control signal from the electronic control unit (not shown), arranged on the upper side of a rear portion of the base body 11, and fixed to the drive transmission portion 30. (See FIG. 2.) An output shaft 21 protrudes from the central portion of the rear end face of the electric motor 20.

The drive transmission portion 30 converts the rotational drive force of the output shaft 21 into an axial force in the linear direction, and is attached to the rear portion of the base body 11. (See FIG. 2.)

The drive transmission portion 30 includes the rod 31, a plurality of balls 32, a tubular nut member 33, and a gear mechanism 34. The rod 31 is in contact with the second slave piston 13. The balls 32 rollingly move along a thread groove spirally formed on the outer circumferential surface of the rod 31, and the nut member 33 is in a screw engagement with the balls 32. The gear mechanism 34 transmits the rotational drive force of the output shaft 21 to the nut member 33. The above components are contained in a housing 35.

Figure 2:
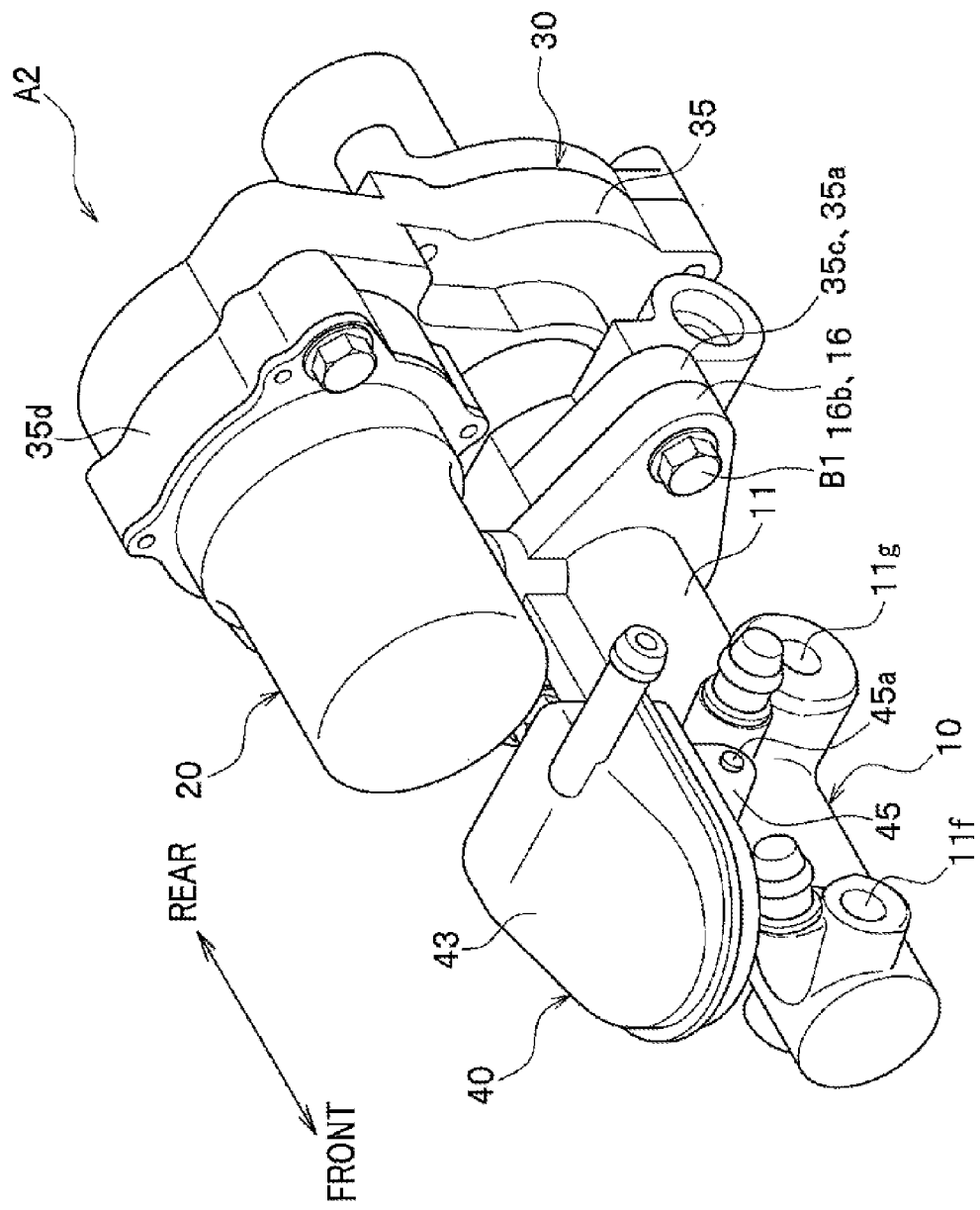
FIG. 2 is a perspective diagram illustrating the motor cylinder device according to the embodiment.

A cylinder fixing portion 35a fixed to the base body 11 is arranged in a front end portion in the housing 35. An opening 35b and a flange portion 35c (as illustrated in FIG. 2) are formed in the cylinder fixing portion 35a. The rear portion of the base body 11 is inserted in the opening 35b, and the flange portion 35c is formed on the outer surface of the housing 35. A motor fixing portion 35d to which the electric motor 20 is fixed is formed on the upper side of the rear portion of the housing 35, and an opening 35e in which the output shaft 21 is inserted is formed in the motor fixing portion 35d.

When the rotational driving force of the output shaft 21 is inputted into the nut member 33 through the gear mechanism 34, the axial force in the linear direction is exerted on the rod 31 by a ball-screw mechanism arranged between the nut member 33 and the rod 31, so that the rod 31 moves back and forth in the axial direction.

The reservoir 40 is a container reserving the brake fluid, and arranged on the upper side of a front portion of the base body 11 of the slave cylinder 10. (See FIG. 2.) The reservoir 40 includes fluid feed portions 41 and 42 connected to the base body 11, and a hose extended from the main reservoir (not shown) is connected to the reservoir 40.

The motor cylinder device A2 communicates with the master cylinder device A1 through the tubes Hc and Hd. When the normally-open shutoff valves 74 and 75 are in the closed state, the hydraulic brake pressure generated in the motor cylinder device A2 is inputted into the master cylinder device A1 through the tubes Hc and Hd, and is further inputted into the hydraulic control device A3 through the hydraulic communication paths 79c and 79d and the tubes Ha and Hb.

The hydraulic control device A3 has such a structure that antilock brake control (ABS control) for suppressing wheel slips, sideslip control and traction control for stabilizing the vehicle behavior, and the like can be performed. The hydraulic control device A3 is connected to the wheel cylinders W through tubes. Although not shown, the hydraulic control device A3 includes a hydraulic unit, electric motors, the electronic control unit (not shown), and the like, where solenoid valves, pumps, and the like are arranged in the hydraulic unit, the electric motors drive the pumps, and the electronic control unit controls the solenoid valves, the motors, and the like.

Next, operations of the vehicle brake system A are briefly explained below. In the normal state, in which the vehicle brake system A normally operates, the normally-open shutoff valves 74 and 75 are closed, and the normally-close shutoff valve 76 is open. When the brake pedal P is manipulated in the above state, the hydraulic brake pressure generated in the master cylinder 71 is not transmitted to the wheel cylinders W, and is instead transmitted to the stroke simulator 72, so that the piston 72a is displaced. Therefore, a stroke of the brake pedal P is allowed and simulated reaction force in response to a manipulation of the brake pedal P is imparted to the brake pedal P.

In addition, when depressing of the brake pedal P is detected by a stroke sensor (not shown) or the like, the electric motor 20 in the motor cylinder device A2 is driven, both of the slave pistons 12 and 13 are displaced, so that the brake fluid in both of the pressure chambers 11b and 11c is pressurized. The electronic control unit (not shown) compares the hydraulic brake pressure outputted from the slave cylinder 10 (the hydraulic brake pressure detected by the pressure sensor 77) with the hydraulic brake pressure outputted from the master cylinder 71 (the hydraulic brake pressure detected by the pressure sensor 78), and controls the number of rotations and the like of the electric motor 20 on the basis of the comparison result.

The hydraulic brake pressure generated in the slave cylinder 10 is transmitted to the wheel cylinders W through the hydraulic control device A3, and the wheel cylinders W are actuated, so that braking forces are exerted on the respective wheels.

Further, in the situation in which the motor cylinder device A2 does not operate (e.g., in cases of emergency or loss of electric power), both of the normally-open shutoff valves 74 and 75 are brought into the open state and the normally-close shutoff valve 76 is brought into the closed state, so that the hydraulic brake pressure generated in the master cylinder 71 is transmitted to the wheel cylinders W.

Next, a concrete structure of the motor cylinder device A2 is explained below.

Figure 3:
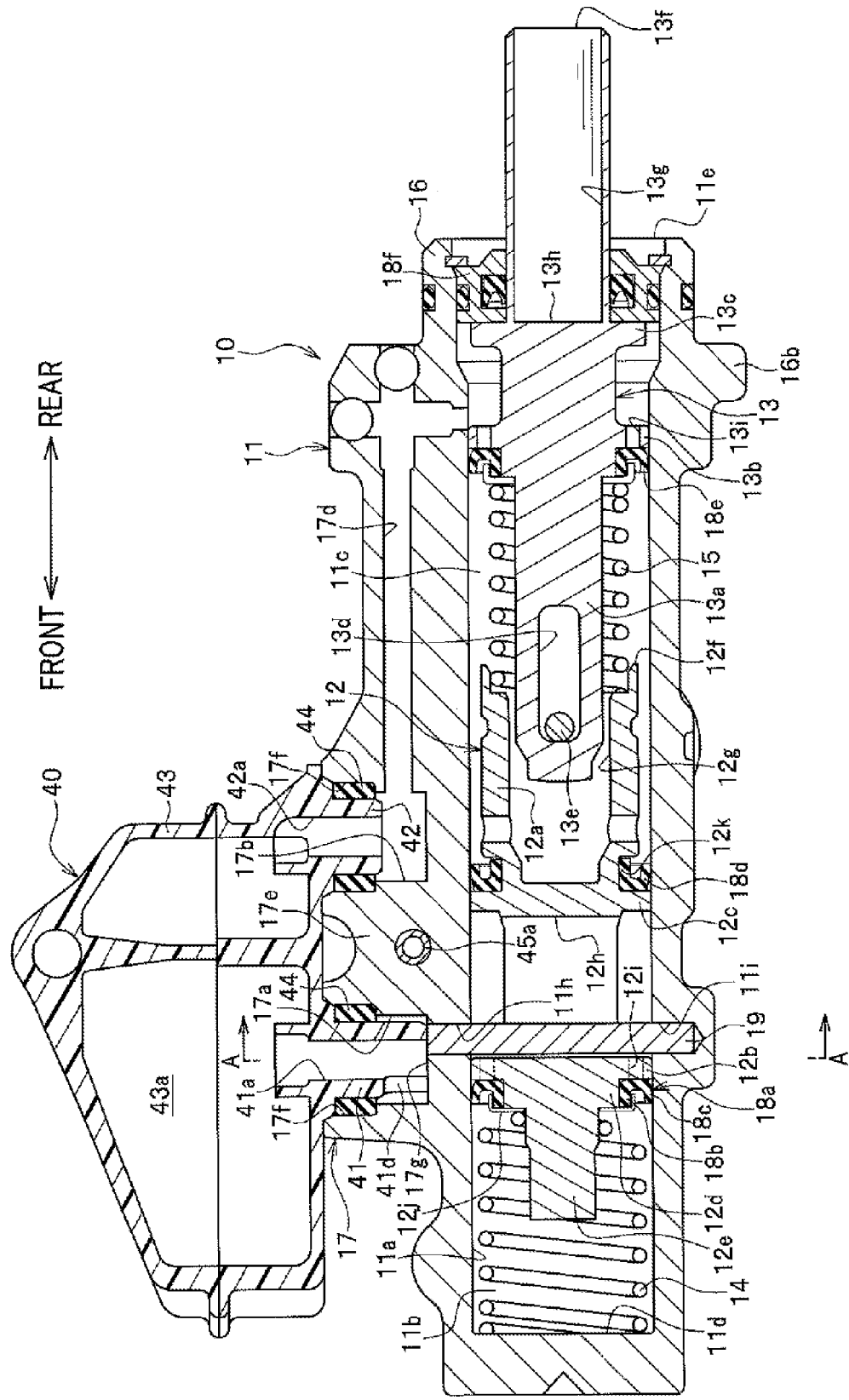
FIG. 3 is a side cross-sectional view of the motor cylinder device according to the embodiment.

The base body 11 is a casting of an aluminum alloy. As illustrated in FIG. 3, the slave cylinder bore 11a having a cylindrical shape with a bottom extends in the front-back direction in the base body 11. The bottom surface 11d is formed on the front side (on the left side in FIG. 3), and the opening 11e is formed on the rear side (on the right side in FIG. 3). In addition, a housing attachment portion 16 is formed in the rear portion of the base body 11, and a reservoir mounting portion 17 is formed in an upper portion of the base body 11.

As illustrated in FIG. 2, a flange portion 16b is formed on the outer surface of the housing attachment portion 16. A drive transmission portion 30 is connected to the rear portion of the base body 11 by fixing the flange portion 16b of the housing attachment portion 16 to the flange portion 35c of the cylinder fixing portion 35a with bolts B1.

As illustrated in FIG. 3, the first slave piston 12 and the second slave piston 13 are arranged in the slave cylinder bore 11a, the first pressure chamber 11b is formed between the bottom surface 11d and the first slave piston 12, and the second pressure chamber 11c is formed between the slave pistons 12 and 13. As illustrated in FIG. 1, the first pressure chamber 11b communicates with the tube Hc through a connection port 11f, and the second pressure chamber 11c communicates with the tube Hd through a connection port 11g.

Figure 4:
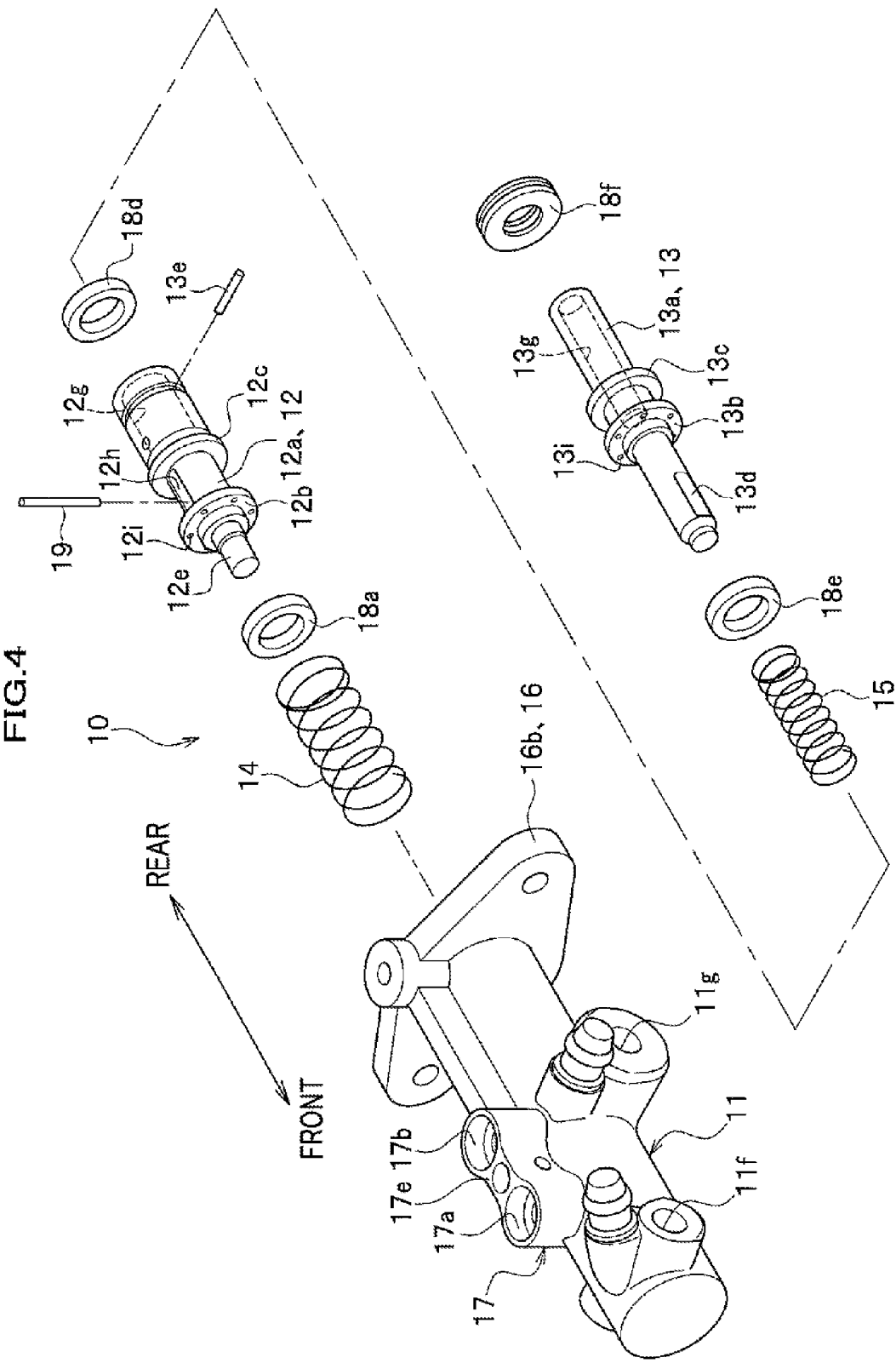
FIG. 4 is an exploded perspective view of a slave cylinder according to the embodiment.

As illustrated in FIG. 4, the first slave piston 12 is a metal part constituted by the shaft member 12a, which has a round cross section. The first flange portion 12b is formed on the outer circumferential surface of the front portion of the shaft member 12a, and the second flange portion 12c is formed on the outer circumferential surface of an approximately middle portion of the shaft member 12a.

Figure 5A:
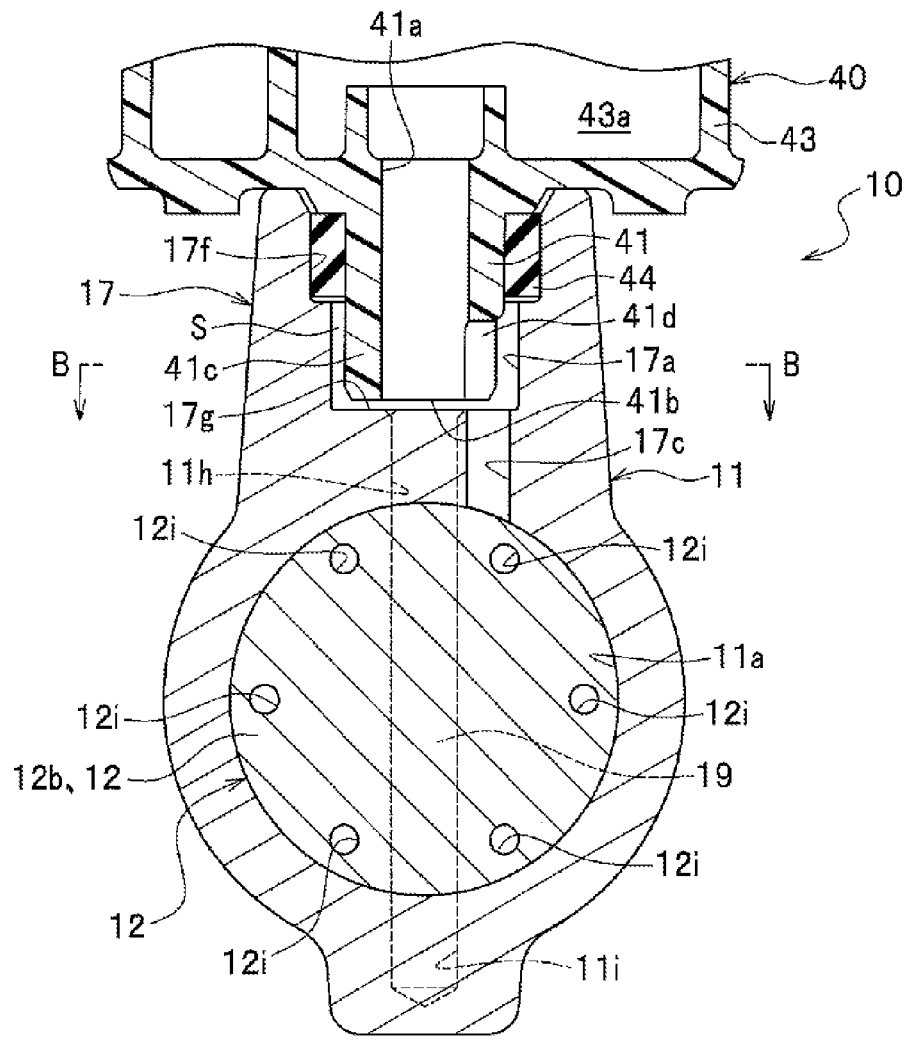
FIGS. 5A and 5B include diagrams illustrating the slave cylinder according to the embodiment, where

As illustrated in FIG. 5A, feeding paths 12i penetrate through the first flange portion 12b in the axial direction. The feeding paths 12i are through-bores having a cylindrical shape and opening on the first pressure chamber 11b side and the side opposite to the first pressure chamber 11b. According to the present embodiment, six feeding paths 12i are arranged equally spaced along the circumferential direction in the first flange portion 12b.

As illustrated in FIG. 3, in the shaft member 12a, a through-bore 12h penetrates in the vertical direction through a middle shaft portion of the shaft member 12a between the first flange portion 12b and the second flange portion 12c. The through-bore 12h is an elongated bore, which is elongated in the axial direction of the shaft member 12a (as illustrated in FIG. 4), and the limiting member 19 is inserted through the through-bore 12h. The limiting member 19 is explained later.

Further, an insertion bore 12g having a cylindrical shape with a bottom is open in a rear end face 12f of the shaft member 12a (as illustrated in FIG. 4).

A first piston sealing member 18a is in contact with the front face of the first flange portion 12b. The first piston sealing member 18a is an annular rubber part, which is externally fitted on a protrusion 12e. The protrusion 12e has a round cross section and protrudes forward from the first flange portion 12b. The first piston sealing member 18a closes the openings on the front side (the first pressure chamber 11b side) of the feeding paths 12i.

The first piston sealing member 18a is a cup seal having a cylindrical portion 18b and a lip portion 18c. The cylindrical portion 18b is externally fitted on a base portion 12d of the protrusion 12e. The lip portion 18c radially extends from the rear-end edge portion of the cylindrical portion 18b. The lip portion 18c is more inclined forward (toward the first pressure chamber 11b side) in relatively outside locations in the radial direction, and the outer circumferential surface of the lip portion 18c is in contact with the inner circumferential surface of the slave cylinder bore 11a.

A fall prevention member 12j is externally fitted on the protrusion 12e. The fall prevention member 12j has an annular shape and constitutes a means for preventing a fall of the first piston sealing member 18a. The fall prevention member 12j is in contact with the base portion 12d of the protrusion 12e and the cylindrical portion 18b of the first piston sealing member 18a.

A concave grove 12k is formed over the entire circumference of the shaft member 12a on the rear side of the second flange portion 12c. A second piston sealing member 18d as a cup seal is externally fitted on the concave grove 12k.

The limiting member 19 protrudes into the slave cylinder bore 11a. The limiting member 19 according to the present embodiment is a rod-like member which passes through the slave cylinder bore 11a in the vertical direction, and also passes through the through-bore 12h in the first slave piston 12. The upper end portion of the limiting member 19 is inserted into an installation bore 11h, and the lower end portion of the limiting member 19 is inserted into a recess 11i. The installation bore 11h and the recess 11i are open in the inner circumferential surface of the slave cylinder bore 11a.

The backward motion of the first slave piston 12 is limited by abutting of the front end of the inner circumferential surface of the through-bore 12h on the limiting member 19. In addition, the forward motion of the first slave piston 12 is limited by abutting of the rear end of the inner circumferential surface of the through-bore 12h on the limiting member 19.

The first elastic member 14 is contained in the first pressure chamber 11b. The first elastic member 14 is a coil spring which is arranged between the bottom surface 11d of the slave cylinder bore 11a and the front end face 12d (the fall prevention member 12j) of the first slave piston 12. The first elastic member 14 is compressed when the first slave piston 12 moves forward, and returns the first slave piston 12 to the backward limit (the initial position) by the elastic force of the first elastic member 14.

As illustrated in FIG. 4, the second slave piston 13 is a metal part constituted by a shaft member 13a, which has a round cross section. A first flange portion 13b and a second flange portion 13c are formed on the outer circumferential surface of an approximately middle portion, in the axial direction, of the shaft member 13a. A plurality of feeding paths 13i penetrate through the first flange portion 13b in the axial direction.

As illustrated in FIG. 3, a third piston sealing member 18e is in contact with the front face of the first flange portion 13b. The third piston sealing member 18e is a cup seal, which is externally fitted on the shaft member 13a. A guide member 18f, which is fitted into the opening 11e of the slave cylinder bore 11a, is arranged on the rear side of the second flange portion 13c. A through-bore is formed in the center of the guide member 18f, and the shaft member 13a is slidably inserted in the guide member 18f. The guide member 18f seals the gap between the inner circumferential surface of the slave cylinder bore 11a and the outer circumferential surface of the shaft member 13a.

A front portion of the shaft member 13a is inserted into the insertion bore 12g in the first slave piston 12. A limiting member 13e, which protrudes into the insertion bore 12g, is inserted into a through-bore 13d formed in the front portion of the shaft member 13a. Therefore, when the second slave piston 13 moves back and forth in the slave cylinder bore 11a, the forward and backward motions of the second slave piston 13 are limited by abutting of the inner circumferential surface of the insertion bore 12g on the limiting member 13e.

A guide bore 13g having a cylindrical shape with a bottom is open in a rear end face 13f of the shaft member 13a (as illustrated in FIG. 4). As illustrated in FIG. 1, the rod 31 in the drive transmission portion 30 is inserted into the guide bore 13g, and the front end face of the rod 31 is in contact with a bottom surface 13h of the guide bore 13g.

As illustrated in FIG. 3, the second elastic member 15 is a coil spring which surrounds the shaft member 13a on the front side of the third piston sealing member 18e. The second elastic member 15 is arranged between a rear end portion of the first slave piston 12 and the first flange portion 13b of the second slave piston 13. The second elastic member 15 is compressed when the second slave piston 13 moves forward, and returns the second slave piston 13 to the backward limit (the initial position) by the elastic force of the second elastic member 15.

The reservoir mounting portion 17 is a portion which is arranged as a mounting seat for the reservoir 40, and is formed in the upper portion of the base body 11. The reservoir mounting portion 17 includes front and rear reservoir union ports 17a and 17b, a first communication bore 17c (as illustrated in FIG. 5A), a second communication bore 17d, and a connection portion 17e.

Each of the front and rear reservoir union ports 17a and 17b has a cylindrical shape, and is arranged on the upper portion of the base body 11 to protrude from the upper portion of the base body 11. In addition, an increased-diameter portion 17f is formed in an upper portion of the inner circumferential surface of each of the front and rear reservoir union ports 17a and 17b. In addition, the connection portion 17e is arranged between the front and rear reservoir union ports 17a and 17b.

Figure 5B:
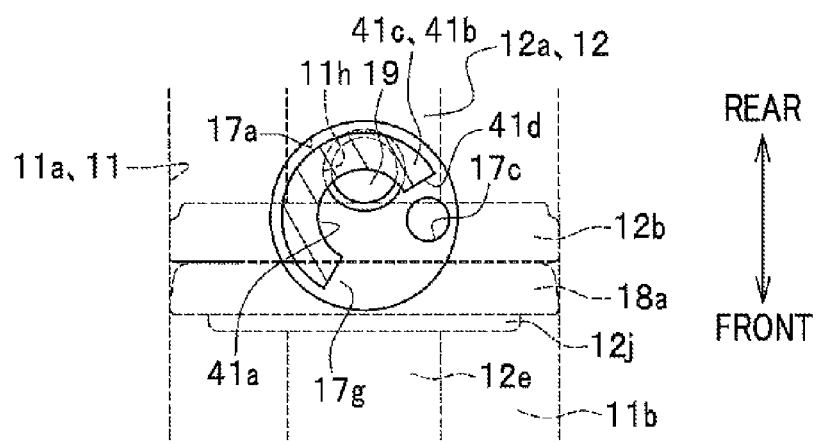

As illustrated in FIG. 5B, the installation bore 11h having a cylindrical shape is open in the bottom surface 17g of the front reservoir union port 17a. The installation bore 11h penetrates through the bottom surface 17g and the inner circumferential surface of the slave cylinder bore 11a. The upper portion of the limiting member 19 is inserted in the installation bore 11h. The installation bore 11h is located on the rear side of the center of the bottom surface 17g, and is open in a vicinity of the outer peripheral area of the bottom surface 17g.

Further, the first communication bore 17c is open in the bottom surface 17g of the front reservoir union port 17a. As illustrated in FIG. 5A, the first communication bore 17c is a through-bore having a cylindrical shape, an upper end opened in the bottom surface 17g of the front reservoir union port 17a, and a lower end opened in the inner circumferential surface of the slave cylinder bore 11a.

As illustrated in FIG. 5B, It is necessary that the first communication bore 17c be open in the inner circumferential surface of the slave cylinder bore 11a on the rear side of the first piston sealing member 18a (the side opposite to the first pressure chamber 11b) in order to prevent inflow of the brake fluid from the first pressure chamber 11b when the first pressure chamber 11b is pressurized. In the state (illustrated in FIG. 5B) in which the first slave piston 12 is located at the backward limit, the first piston sealing member 18a moves backward to the position in which the first piston sealing member 18a overlaps a front portion of the bottom surface 17g, and the lower end portion of the first communication bore 17c is open in a position in which the lower end portion of the first communication bore 17c overlaps the outer circumferential surface of the first flange portion 12b. Since the gap between the first piston sealing member 18a and the installation bore 11h in the front-back direction is reduced as above, it is difficult to open the first communication bore 17c in the central area of the bottom surface 17g.

Therefore, according to the present embodiment, the first communication bore 17c is formed to be open in the area on the right side (in FIG. 5B) of the center of the bottom surface 17g. Since the first communication bore 17c is formed to be open in the position laterally shifted from the central area of the bottom surface 17g as above, i.e., in the vicinity of the outer peripheral portion of the bottom surface 17g, it is possible to avoid interference of the first communication bore 17c and the installation bore 11h while arranging the first communication bore 17c on the rear side of the first piston sealing member 18a.

As illustrated in FIG. 3, one end of the second communication bore 17d is open in the inner circumferential surface of the rear reservoir union port 17b, and the other end of the second communication bore 17d is open in the inner circumferential surface of the slave cylinder bore 11a on the rear side of the first flange portion 13b in the second slave piston 13.

The fluid feeding portions 41 and 42 having a cylindrical shape and being arranged to protrude from the lower face of the reservoir 40 are respectively inserted in the front and rear reservoir union ports 17a and 17b, and the container body 43 of the reservoir 40 is placed on the upper ends of the front and rear reservoir union ports 17a and 17b. A connection portion 45, which is formed between the front-side and rear-side fluid feed portions 41 and 42 (as illustrated in FIG. 2), is fixed to the connection portion 17e in the reservoir mounting portion 17 with a spring pin 45a.

Fluid feeding bores 41a and 42a, which communicate with a reservation space 43a in the container body 43, penetrate through the fluid feed portions 41 and 42 in the vertical direction. The reservation space 43a communicates with the slave cylinder bore 11a through the front-side fluid feeding bore 41a and the first communication bore 17c (illustrated in FIG. 5A). The brake fluid in the reservation space 43a flows into the rear side of the first flange portion 12b through the gap between the inner circumferential surface of the slave cylinder bore 11a and the outer circumferential surface of the first flange portion 12b. In addition, the reservation space 43a communicates with the slave cylinder bore 11a through the rear-side fluid feeding bore 42a and the second communication bore 17d.

When the hydraulic brake pressure in the first pressure chamber 11b falls below the hydraulic brake pressure on the rear side of the first piston sealing member 18a because of the wearing of the brake pads or the absorption effect during the vehicle behavior control, the pressure difference causes the lip portion 18c of the first piston sealing member 18a to bend inward, so that the brake fluid passes over the outer peripheral portion of the first piston sealing member 18a from the rear side to the front side, and flows into the first pressure chamber 11b.

As explained above, the lip portion 18c formed in the outer peripheral portion of the first piston sealing member 18a realizes a check valve which allows only the inflow of the brake fluid from the rear side (the side opposite to the first pressure chamber 11b) to the front side (the first pressure chamber 11b side). Therefore, it is possible to prevent inflow of the brake fluid from the first pressure chamber 11b to the rear side of the first piston sealing member 18a (the first communication bore 17c side) when the first slave piston 12 moves forward, cause the brake fluid to pass over the outer peripheral portion of the first piston sealing member 18a, and feed the brake fluid to the first pressure chamber 11b when the hydraulic brake pressure in the first pressure chamber 11b is lowered.

In addition, the brake fluid flows from the rear side of the first flange portion 12b of the first slave piston 12 into the rear side of the first piston sealing member 18a (the front side of the first flange portion 12b) through the feeding paths 12i. Therefore, it is possible to cause the brake fluid to smoothly flow into the first pressure chamber 11b through each of the feeding paths 12i even when the flow rate of the brake fluid absorbed by the first pressure chamber 11b is great, e.g., when the hydraulic brake pressure in the first pressure chamber 11b is greatly lowered by the absorption effect during the vehicle behavior control.

Further, when the brake fluid is absorbed into the second pressure chamber 11c, the brake fluid passes over the outer peripheral portion of the third piston sealing member 18e and flows into the second pressure chamber 11c.

Reservoir sealing members 44 having an annular shape and being externally fitted on the fluid feed portions 41 and 42 are fitted into the increased-diameter portions 17f of the front and rear reservoir union ports 17a and 17b. The reservoir sealing members 44 are rubber parts which seal the gaps between the inner circumferential surfaces of the front and rear reservoir union ports 17a and 17b and the outer circumferential surfaces of the fluid feed portions 41 and 42. Thus, in the above structure, the installation bore 11h and the first communication bore 17c which are formed in the bottom surface 17g of the front reservoir union port 17a are sealed with one of the reservoir sealing members 44 from the external space.

As illustrated in FIG. 5B, the front-side fluid feed portion 41 includes a fall prevention portion 41c and a cutout portion 41d. The fall prevention portion 41c is arranged opposed to the installation bore 11h, and the cutout portion 41d is arranged opposed to the first communication bore 17c. (See FIG. 5A.) That is, the upper half of the fluid feed portion 41 has a circumferentially continuous, completely cylindrical shape, and the lower half of the fluid feed portion 41 has an arc-shaped (C-shaped) axial cross section, in which an approximately half in the circumferential direction is lacking.

As illustrated in FIG. 3, the fall prevention portion 41c is arranged in a vicinity of the bottom surface 17g of the front reservoir union port 17a. Thus, a means for preventing a fall of the limiting member 19 from the installation bore 11h is realized by arranging the fall prevention portion 41c over the limiting member 19 as above.

As illustrated in FIG. 5B, the cutout portion 41d is a portion which is extended in the axial direction to the tip side of the fluid feed portion 41 and produced by removing an approximately half of a lower-end edge portion 41b (the right side illustrated in FIG. 5B) in the circumferential direction. In the cutout portion 41d, the removed portion extends in the vertical direction to a vicinity of the one of the reservoir sealing members 44, so that the space over the first communication bore 17c is enlarged by the cutout portion 41d.

In the motor cylinder device A2 as explained above, the lower-end edge portion 41b realizes the means for preventing a fall of the limiting member 19 as illustrated in FIG. 5A. In addition, the installation bore 11h for the limiting member 19 is sealed from the external space with the one of the reservoir sealing members 44 externally fitted on the fluid feed portion 41. Since the limiting member 19 is arranged by effectively using the space in the base body 11 as above, it is possible to reduce the number of parts and the size of the base body 11.

In addition, even when air intrudes into the gap S between the inner circumferential surface of the front reservoir union port 17a and the outer circumferential surface of the fluid feed portion 41, the air is exhausted into the reservoir 40 through the cutout portion 41d in the fluid feed portion 41. Therefore, it is possible to prevent air accumulation in the front reservoir union port 17a. Further, since the cutout portion 41d is formed to extend to the vicinity of the one of the reservoir sealing members 44, it is possible to exhaust the air, with high reliability, through the gap S between the inner circumferential surface of the front reservoir union port 17a and the outer circumferential surface of the fluid feed portion 41.

Furthermore, since the first communication bore 17c is formed at the position opposed to the cutout portion 41d of the fluid feed portion 41, it is possible to cause the brake fluid to smoothly flow from the fluid feed portion 41 into the first communication bore 17c.

Moreover, since the cutout portion 41d is formed in the fluid feed portion 41, the first communication bore 17c can be located close to the outer peripheral portion of the bottom surface 17g in the front reservoir union port 17a, so that the degree of freedom in designing the slave cylinder 10 can be increased.

Although an embodiment of the present invention is explained above, the present invention is not limited to the explained embodiment, and the present invention can be modified as needed without departing from the gist of the present invention. Although, in the explained embodiment, the first communication bore 17c is formed in the position opposed to the cutout portion 41d as illustrated in FIG. 5B, the first communication bore 17c may be formed in the center of the bottom surface 17g in the case where space can be secured in the center of the bottom surface 17g.

In addition, although the six feeding paths 12i are formed in the first flange portion 12b of the first slave piston 12 as illustrated in FIG. 5A, the number of the feeding paths 12i is not limited to six. Further, the feeding paths may be constituted by one or more grooves formed on the outer peripheral portions of the first flange portion 12b.

LIST OF REFERENCES

10: Slave Cylinder
11: Base Body
11a: Slave Cylinder Bore
11c: First Pressure Chamber
11b: Second Pressure Chamber
11h: Installation Bore
12: First Slave Piston
12a: Shaft Member
12b: First Flange Portion
12c: Second Flange Portion
12i: Feeding Paths
13: Second Slave Piston
14: First Elastic Member
15: Second Elastic Member
17: Reservoir Mounting Portion
17a: Reservoir Union Port
17b: Reservoir Union Port
17c: First Communication Bore
17d: Second Communication Bore
17g: Bottom Surface
18a: First Piston Sealing Member
18d: Second Piston Sealing Member
18e: Third Piston Sealing Member
19: Limiting Member
20: Electric Motor
21: Output Shaft
30: Drive Transmission Portion
31: Rod
40: Reservoir
41: Fluid feeding portion
41a: Fluid Feeding Bore
41c: Fall Prevention Portion
41d: Cutout Portion
42: Fluid feeding portion
44: Reservoir Sealing Member
71: Master Cylinder
72: Stroke Simulator
73: Reservoir
A: Vehicle Brake System
A1: Master Cylinder Device
A2: Motor Cylinder Device (Cylinder Device)
A3: Hydraulic Control Device
P: Brake Pedal (Brake Manipulator)
W: Wheel Cylinders

The invention claimed is:

1. A cylinder device for generating a hydraulic brake pressure according to an amount of manipulation of a brake manipulator, comprising:
a base body in which a cylinder bore and a reservoir union port are formed, where the cylinder bore has a bottom, the reservoir union port communicates with the cylinder bore, and a reservoir reserving brake fluid is connected to the reservoir union port;
a piston inserted in the cylinder bore;
an elastic member arranged between a bottom surface of the cylinder bore and the piston;
a limiting member which projects into the cylinder bore and limits backward motion of the piston;
the reservoir which has a fluid feeding portion having a tubular shape and being inserted in the reservoir union port; and
a reservoir sealing member which has an annular shape and is externally fitted on the fluid feeding portion;
wherein a communication bore and an installation bore each of which has an end opened in the bottom surface of the reservoir union port and another end opened in an inner circumferential surface of the cylinder bore are formed in the base body, and the limiting member is inserted in the installation bore; and
the fluid feeding portion includes, a tip portion arranged opposed to the limiting member, and a cutout portion extended in an axial direction to a tip side of the fluid feeding portion.

2. The cylinder device according to claim 1, wherein the communication bore is formed at a position opposed to the cutout portion.

3. The cylinder device according to claim 1, wherein
the piston includes a shaft member and a flange portion formed on an outer circumferential surface of the shaft member,
a pressure chamber is formed between the bottom surface of the cylinder bore and the shaft member,
a piston sealing member externally fitted on the shaft member is arranged on the pressure chamber side of the flange portion,
the communication bore is opened in the inner circumferential surface of the cylinder bore on a side, opposite to the pressure chamber, of the piston sealing member, and
a feeding path opened on the pressure chamber side and on the side opposite to the pressure chamber is formed in the flange portion.

4. The cylinder device according to claim 3, wherein the piston sealing member is a cup seal, and an outer peripheral portion of the piston sealing member allows flow of the brake fluid only from the side opposite to the pressure chamber to the pressure chamber side.

5. The cylinder device according to claim 2, wherein
the piston includes a shaft member and a flange portion formed on an outer circumferential surface of the shaft member,
a pressure chamber is formed between the bottom surface of the cylinder bore and the shaft member,
a piston sealing member externally fitted on the shaft member is arranged on the pressure chamber side of the flange portion,
the communication bore is opened in the inner circumferential surface of the cylinder bore on a side, opposite to the pressure chamber, of the piston sealing member, and a feeding path opened on the pressure chamber side and on the side opposite to the pressure chamber is formed in the flange portion.

* * * * *